United States Patent
Routh et al.

(10) Patent No.: US 9,081,115 B2
(45) Date of Patent: Jul. 14, 2015

(54) CONVERGENCE RATE OF FULL WAVEFIELD INVERSION USING SPECTRAL SHAPING

(71) Applicants: Partha S. Routh, Katy, TX (US); Spyridon K. Lazaratos, Houston, TX (US); Anatoly Baumstein, Houston, TX (US); Ivan Chikichev, Houston, TX (US); Ke Wang, Sugar Land, TX (US)

(72) Inventors: Partha S. Routh, Katy, TX (US); Spyridon K. Lazaratos, Houston, TX (US); Anatoly Baumstein, Houston, TX (US); Ivan Chikichev, Houston, TX (US); Ke Wang, Sugar Land, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 1 day.

(21) Appl. No.: 14/492,798

(22) Filed: Sep. 22, 2014

(65) Prior Publication Data

US 2015/0012256 A1 Jan. 8, 2015

Related U.S. Application Data

(63) Continuation of application No. 13/361,609, filed on Jan. 30, 2012, now Pat. No. 8,892,413.

(60) Provisional application No. 61/508,440, filed on Jul. 15, 2011, provisional application No. 61/469,478, filed on Mar. 30, 2011.

(51) Int. Cl.
G06G 7/48 (2006.01)
G01V 1/28 (2006.01)

(52) U.S. Cl.
CPC .............. *G01V 1/28* (2013.01); *G01V 2210/66* (2013.01); *G01V 2210/67* (2013.01)

(58) Field of Classification Search
CPC ............. G01V 1/00; G01V 1/28; G01V 1/30; G01V 1/301; G01V 2210/66; G01V 2210/67
USPC .............................................. 703/1, 10; 702/6
See application file for complete search history.

(56) References Cited

U.S. PATENT DOCUMENTS

| | | | |
|---|---|---|---|
| 3,812,457 A | 5/1974 | Weller | |
| 3,864,667 A | 2/1975 | Bahjat | |

(Continued)

FOREIGN PATENT DOCUMENTS

| | | |
|---|---|---|
| CA | 2 796 631 | 11/2011 |
| EP | 1 094 338 | 4/2001 |

(Continued)

OTHER PUBLICATIONS

Gao, H. et al. (2008), "Implementation of perfectly matched layers in an arbitrary geometrical boundary for leastic wave modeling," *Geophysics J. Int.* 174, pp. 1029-1036.

(Continued)

*Primary Examiner* — Eunhee Kim
(74) *Attorney, Agent, or Firm* — ExxonMobil Upstream Research Company Legal Dept.

(57) ABSTRACT

Method for speeding up iterative inversion of seismic data (106) to obtain a subsurface model (102), using local cost function optimization. The frequency spectrum of the updated model at each iteration is controlled to match a known or estimated frequency spectrum for the subsurface region, preferably the average amplitude spectrum of the subsurface P-impedance. The controlling is done either by applying a spectral-shaping filter to the source wavelet (303) and to the data (302) or by applying the filter, which may vary with time, to the gradient of the cost function (403). The source wavelet's amplitude spectrum (before filtering) should satisfy $D(f)=fI_p(f)W(f)$, where f is frequency, D(f) is the average amplitude spectrum of the seismic data, and $I_p(f)$ is the average amplitude spectrum for P-impedance in the subsurface region (306, 402) or an approximation thereof.

4 Claims, 8 Drawing Sheets

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,575,830 A | 3/1986 | Ingram et al. |
| 4,594,662 A | 6/1986 | Devaney |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,924,049 A | 7/1999 | Beasley et al. |
| 5,999,488 A | 12/1999 | Smith |
| 5,999,489 A | 12/1999 | Lazaratos |
| 6,005,916 A | 12/1999 | Johnson et al. |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,547,794 B2 | 10/2013 | Gulati et al. |
| 8,688,381 B2 | 4/2014 | Routh et al. |
| 8,781,748 B2 | 7/2014 | Laddoch et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225483 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0052278 A1 | 2/2009 | Iranpour et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |

(56) References Cited

U.S. PATENT DOCUMENTS

| | | |
|---|---|---|
| 2010/0142323 A1 | 6/2010 | Chu et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0051553 A1 | 3/2011 | Scott et al. |
| 2011/0069581 A1 | 3/2011 | Krohn |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311151 A1 | 11/2013 | Plessix |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Gibson, B. et al. (1984), "Predictive deconvolution and the zero-phase source," *Geophysics* 49(4), pp. 379-397.

Godfrey, R. J. et al. (1998), "Imaging the Foiaven Ghost," *SEG Expanded Abstracts*, 4 pgs.

Griewank, A. (1992), "Achieving logarithmic growth of temporal and spatial complexity in reverse automatic differentiation," 1 *Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Hampson, D.P. et al. (2005), "Simultaneous inversion of pre-stack seismic data," SEG 75$^{th}$ Annual Int'l. Meeting, *Expanded Abstracts*, pp. 1633-1637.

Heinkenschloss, M. (2008), :"Numerical Solution of Implicity Constrained Optimization Problems," CAAM Technical Report TR08-05, 25 pgs.

Helbig, K. (1994), "Foundations of Anisotropy for Exploration Seismics," Chapter 5, pp. 185-194.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Hu, L.Z. et al. (1987), "Wave-field transformations of vertical seismic profiles," *Geophysics* 52, pp. 307-321.

Huang, Y. et al. (2012), "Multisource least-squares migration of marine streamer and land data with frequency-division encoding," *Geophysical Prospecting* 60, pp. 663-680.

Igel, H. et al. (1996), "Waveform inversion of marine reflection seismograms for P impedance and Poisson's ratio," *Geophys. J Int.* 124, pp. 363-371.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70$^{th}$ Annual Meeting Expanded Abstracts*, pp. 786-789.

Kennett, B.L.N. (1991), "The removal of free surface interactions from three-component seismograms", *Geophys. J Int.* 104, pp. 153-163.

Kennett, B.L.N. et al. (1988), "Subspace methods for large inverse problems with multiple parameter classes," *Geophysical J.* 94, pp. 237-247.

Krebs, J.R. (2008), "Fast Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lancaster, S. et al. (2000), "Fast-track 'colored' inversion," 70$^{th}$ SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

(56) References Cited

OTHER PUBLICATIONS

Lazaratos, S. (2006), "Spectral Shaping Inversion for Elastic and Rock Property Estimation," *Research Disclosure*, Issue 511, pp. 1453-1459.
Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," The Leading Edge, pp. 650-663.
Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whiley & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007) , "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Marmousi," *The Leading Edge*, pp. 156-166.
Meier, M.A. et al. (2009), "Converted wave resolution," Geophysics, 74(2):doi:10.1190/1.3074303, pp. Q1-Q16.
Moghaddam, P.P. et al. (2010), "Randomized full-waveform inversion: a dimenstionality-reduction approach," 80th SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.
Mora, P. (1987), "Elastic Wavefield Inversion," PhD Thesis, Stanford University, pp. 22-25.
Mora, P. (1989), "Inversion=migration+tomography," Geophysics 64, pp. 888-901.
Nazarian, S. et al. (1983), "Use of spectral analysis of surface waves method for determination of moduli and thickness of pavement systems," Transport Res. Record 930, pp. 38-45.
Neelamani, R., (2008), "Simultaneous sourcing without compromise," 70th Annual Int'l. Conf. and Exh., EAGE, 5 pgs.
Neelamani, R. (2009), "Efficient seismic forward modeling using simultaneous sources and sparsity," SEG Expanded Abstracts, pp. 2107-2111.
Nocedal, J. et al. (2006), "Numerical Optimization, Chapt. 7—Large-Scale Unconstrained Optimization," Springer, New York, 2nd Edition, pp. 165-176.
Nocedal, J. et al. (2000), "Numerical Optimization-Calculating Derivatives," Chapter 8, Springer Verlag, pp. 194-199.
Ostmo, S. et al. (2002), "Finite-difference iterative migration by linearized waveform inversion in the frequency domain," SEG Int'l. Expo. & 72nd Ann. Meeting, 4 pgs.
Park, C.B. et al. (1999), "Multichannel analysis of surface waves," *Geophysics* 64(3), pp. 800-808.
Park, C.B. et al. (2007), "Multichannel analysis of surface waves (MASW)—active and passive methods," *The Leading Edge*, pp. 60-64.
Pica, A. et al. (2005), "3D Surface-Related Multiple Modeling, Principles and Results," 2005 SEG Ann. Meeting, *SEG Expanded Abstracts* 24, pp. 2080-2083.
Plessix, R.E. et al. (2004), "Frequency-domain finite-difference amplitude preserving migration," *Geophys. J. Int.* 157, pp. 975-987.
Porter, R.P. (1989), "Generalized holography with application to inverse scattering and inverse source problems," In E. Wolf, editor, Progress in Optics XXVII, Elsevier, pp. 317-397.
Pratt, R.G. et al. (1998), "Gauss-Newton and full Newton methods in frequency-space seismic waveform inversion," *Geophys. J. Int.* 133, pp. 341-362.
Pratt, R.G. (1999), "Seismic waveform inversion in the frequency domain, Part 1: Theory and verification in a physical scale model," *Geophysics* 64, pp. 888-901.
Rawlinson, N. et al. (2008), "A dynamic objective function technique for generating multiple solution models in seismic tomography," *Geophys. J Int.* 178, pp. 295-308.
Rayleigh, J.W.S. (1899), "On the transmission of light through an atmosphere containing small particles in suspension, and on the origin of the blue of the sky," Phil. Mag. 47, pp. 375-384.
Romero, L.A. et al. (2000), Phase encoding of shot records in prestack migration, *Geophysics* 65, pp. 426-436.
Abt, D.L. et al. (2010), "North American lithospheric discontinuity structured imaged by Ps and SP receiver functions," *J. Geophys. Res.*, 24 pgs.
Akerberg, P., et al. (2008), "Simultaneous source separation by sparse radon transform," 78th SEG Annual International Meeting, *Expanded Abstracts*, pp. 2801-2805.
Aki, K. et al. (1980), "Quantitative Seismology: Theory and Methods vol. I—Chapter 7—Surface Waves in a Vertically Heterogenous Medium," W.H. Freeman and Co., pp. 259-318.
Aki, K. et al. (1980), "Quantitative Seismology: Theory and Methods vol. 1," W.H. Freeman and Co., p. 173.
Aki et al. (1980), "Quantitative Seismology, Theory and Methods," Chapter 5.20, W.H. Freeman & Co., pp. 133-155.
Amundsen, L. (2001), "Elimination of free-surface related multiples without need of the source wavelet," *Geophysics* 60(1), pp. 327-341.
Anderson, J.E. et al. (2008), "Sources Near the Free-Surface Boundary: Pitfalls for Elastic Finite-Difference Seismic Simulation and Multi-Grid Waveform Inversion," 70th EAGE Conf. & Exh., 4 pgs.
Barr, F.J. et al. (1989), "Attenuation of Water-Column Reverberations Using Pressure and Velocity Detectors in a Water-Bottom Cable," 59th Annual SEG meeting, *Expanded Abstracts*, pp. 653-656.
Baumstein, A. et al. (2009), "Scaling of the Objective Function Gradient for Full Wavefield Inversion," SEG Houston 2009 Int'l. Expo and Annual Meeting, pp. 224-2247.
Beasley, C. (2008), "A new look at marine simultaneous sources," *The Leading Edge* 27(7), pp. 914-917.
Beasley, C. (2012), "A 3D simultaneous source field test processed using alternating projections: a new active separation method," *Geophsyical Prospecting* 60, pp. 591-601.
Beaty, K.S. et al. (2003), "Repeatability of multimode Rayleigh-wave dispersion studies," *Geophysics* 68(3), pp. 782-790.
Beaty, K.S. et al. (2002), "Simulated annealing inversion of multimode Rayleigh wave dispersion waves for geological structure," *Geophys. J. Int.* 151, pp. 622-631.
Becquey, M. et al. (2002), "Pseudo-Random Coded Simultaneous Vibroseismics," SEG Int'l. Exposition and 72th Annl. Mtg., 4 pgs.
Ben-Hadj-Ali, H. et al. (2009), "Three-dimensional frequency-domain full waveform inversion with phase encoding," *SEG Expanded Abstracts*, pp. 2288-2292.
Ben-Hadj-Ali, H. et al. (2011), "An efficient frequency-domain full waveform inversion method using simultaneous encoded sources," *Geophysics* 76(4), pp. R109-R124.
Benitez, D. et al. (2001), "The use of the Hilbert transform in ECG signal analysis," *Computers in Biology and Medicine* 31, pp. 399-406.
Berenger, J-P. (1994), "A Perfectly Matched Layer for the Absorption of Electromagnetic Waves," *J. of Computational Physics* 114, pp. 185-200.
Berkhout, A.J. (1987), "Applied Seismic Wave Theory," Elsevier Science Publishers, p. 142.
Berkhout, A.J. (1992), "Areal shot record technology," *Journal of Seismic Exploration* 1, pp. 251-264.
Berkhout, A.J. (2008), "Changing the mindset in seismic data acquisition," *The Leading Edge* 27(7), pp. 924-938.

(56) References Cited

OTHER PUBLICATIONS

Beylkin, G (1985), "Imaging of discontinuities in the inverse scattering problem by inversion of a causal generalized Radon transform," *J Math. Phys.* 26, pp. 99-108.

Biondi, B. (1992), "Velocity estimation by beam stack," *Geophysics* 57(8), pp. 1034-1047.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), 3D Multisource Full-Waveform using Dynamic Random Phase Encoding, SEG Denver 2010 Annual Meeting, pp. 1044-1049.

Boonyasiriwat, C. et al. (2010), 3D Multisource Full-Waveform using Dynamic Random Phase Encoding, SEG Denver 2010 Annual Meeting, pp. 3120-3124.

Bunks, C., et al. (1995), "Multiscale seismic waveform inversion," *Geophysics* 60, pp. 1457-1473.

Burstedde, G. et al. (2009), "Algorithmic strategies for full waveform inversion: 1D experiments," *Geophysics* 74(6), pp. WCC17-WCC46.

Chavent, G. et al. (1999), "An optimal true-amplitude least-squares prestack depth-migration operator," *Geophysics* 64(2), pp. 508-515.

Choi, Y. et al. (2011), "Application of encoded multisource waveform inversion to marine-streamer acquisition based on the global correlation," $73^{rd}$ EAGE Conference, *Abstract*, pp. F026.

Choi, Y et al. (2012), "Application of multi-source waveform inversion to marine stream data using the global correlation norm," *Geophysical Prospecting* 60, pp. 748-758.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dickens, T.A. et al. (2011), RTM angle gathers using Poynting vectors, *SEG Expanded Abstracts* 30, pp. 3109-3113.

Donerici, B. et al. (1005), "Improved FDTD Subgridding Algorithms Via Digital Filtering and Domain Overriding," *IEEE Transactions on Antennas and Propagation* 53(9), pp. 2938-2951.

Downey, N. et al. (2011), "Random-Beam Full-Wavefield Inversion," 2011 San Antonio Annual Meeting, pp. 2423-2427.

Dunkin, J W et al. (1973), "Effect of Normal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Etgen, J.T. et al. (2007), "Computational methods for large-scale 3D acoustic finite-difference modeling: A tutorial," *Geophysics* 72(5), pp. SM223-SM230.

Fallat, M.R. et al. (1999), "Geoacoustic inversion via local, global, and hybrid algorithms," *Journal of the Acoustical Society of America* 105, pp. 3219-3230.

Fichtner, a. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J Int.* 153, pp. 719-734.

Ronen S. et al. (2005), "Imaging Downgoing waves from Ocean Bottom Stations," *SEG Expanded Abstracts*, pp. 963-967.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Ryden, N. et al. (2006), "Fast simulated annealing inversion of surface waves on pavement using phase-velocity spectra," *Geophysics* 71(4), pp. R49-R58.

Sambridge, M.S. et al. (1991), "An Alternative Strategy for Non-Linear Inversion of Seismic Waveforms," *Geophysical Prospecting* 39, pp. 723-736.

Schoenberg, M. et al. (1989), "A calculus for finely layered anisotropic media," *Geophysics* 54, pp. 581-589.

Schuster, G.T. et al. (2010), "Theory of Multisource Crosstalk Reduction by Phase-Encoded Statics," SEG Denver 2010 Ann. Meeting, pp. 3110-3114.

Sears, T.J. et al. (2008), "Elastic full waveform inversion of multi-component OBC seismic data," *Geophysical Prospecting* 56, pp. 843-862.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," $73^{rd}$ Ann. Meeting of Society of Exploration Geophysicists, 4 pgs.

Sheng, J. et al. (2006), "Early arrival waveform tomography on near-surface refraction data," *Geophysics* 71, pp. U47-U57.

Sheriff, R.E.et al. (1982), "*Exploration Seismology*", pp. 134-135.

Shih, R-C. et al. (1996), "Iterative pre-stack depth migration with velocity analysis," *Terrestrial, Atmospheric & Oceanic Sciences* 7(2), pp. 149-158.

Shin, C. et al. (2001), "Waveform inversion using a logarithmic wavefield," *Geophysics* 49, pp. 592-606.

Simard, P.Y. et al. (1990), "Vector Field Restoration by the Method of Convex Projections," *Computer Vision, Graphics and Image Processing* 52, pp. 360-385.

Sirgue, L. (2004), "Efficient waveform inversion and imaging: A strategy for selecting temporal frequencies," *Geophysics* 69, pp. 231-248.

Soubaras, R. et al. (2007), "Velocity model building by semblance maximization of modulated-shot gathers," *Geophysics* 72(5), pp. U67-U73.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W. (2007), "Reverse time migration with optimal checkpointing," *Geophysics* 72(5), pp. P.SM213-P.SM221.

Symes, W.W. (2009), "Interface error analysis for numerical wave propagation," *Compu. Geosci.* 13, pp. 363-371.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Tarantola, A. (1986), "A strategy for nonlinear elastic inversion of seismic reflection data," *Geophysics* 51(10), pp. 1893-1903.

Tarantola, A. (1988), "Theoretical background for the inversion of seismic waveforms, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Tarantola, A. (1984), "Inversion of seismic reflection data in the acoustic approximation," *Geophysics* 49, pp. 1259-1266.

Trantham, E.C. (1994), "Controlled-phase acquisition and processing," *SEG Expanded Abstracts* 13, pp. 890-894.

Tsvankin, I. (2001), "Seismic Signatures and Analysis of Reflection Data in Anisotropic Media," Elsevier Science, p. 8.

Valenciano, A.A. (2008), "Imaging by Wave-Equation Inversion," A Dissertation, Stanford University, 138 pgs.

van Groenestijn, G.J.A. et al. (2009), "Estimating primaries by sparse inversion and application to near-offset reconstruction," *Geophyhsics* 74(3), pp. A23-A28.

(56) References Cited

OTHER PUBLICATIONS van Manen, D.J. (2005), "Making wave by time reversal," *SEG International Exposition and 75th Annual Meeting, Expanded Abstracts*, pp. 1763-1766.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Versteeg, R. (1994), "The Marmousi experience: Velocity model determination on a synthetic complex data set," *The Leading Edge*, pp. 927-936.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," *Geophysics* 72(2), pp. V33-V39.

Wang, K. et al. (2009), "Simultaneous full-waveform inversion for source wavelet and earth model," SEG Int'l. Expo. & Ann. Meeting, Expanded Abstracts, pp. 2537-2541.

Weglein, A.B. (2003), "Inverse scattering series and seismic exploration," *Inverse Problems* 19, pp. R27-R83.

Wong, M. et al. (2010), "Joint least-squares inversion of up- and down-going signal for ocean bottom data sets," *SEG Expanded Abstracts* 29, pp. 2752-2756.

Wu R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Xie, X. et al. (2002), "Extracting angle domain information from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yang, K. et al. (2000), "Quasi-Orthogonal Sequences for Code-Division Multiple-Access Systems," *IEEE Transactions on Information Theory* 46(3), pp. 982-993.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

*IPOS* Written Opinion, dated Sep. 22, 2014, Application No. 201305607-2.

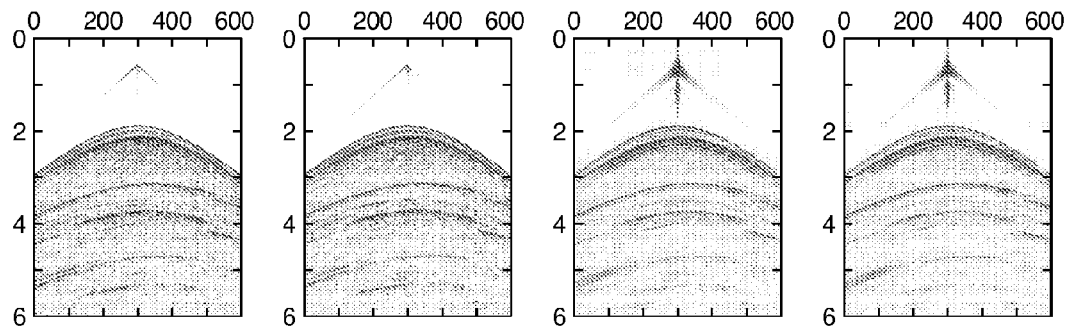
FIG. 11A  FIG. 11B  FIG. 11C  FIG. 11D
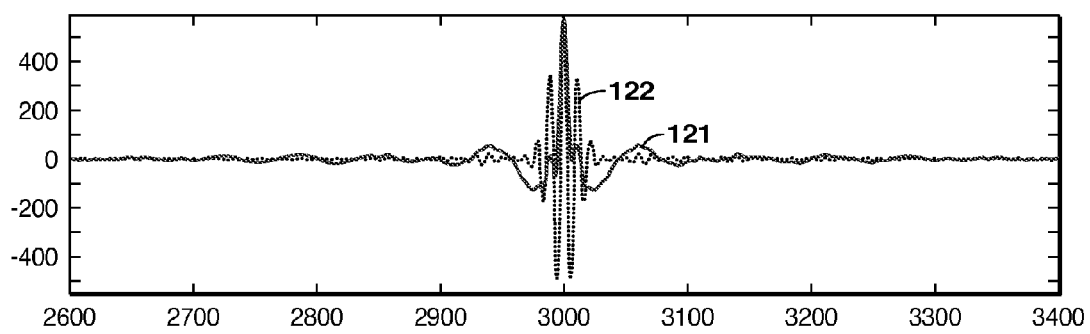
FIG. 12

CONVERGENCE RATE OF FULL WAVEFIELD INVERSION USING SPECTRAL SHAPING

CROSS-REFERENCE TO RELATED APPLICATION

This application is a continuation of U.S. patent application Ser. No. 13/361,609, filed Jan. 30, 2012, entitled "Convergence Rate of Full Wavefield Inversion Using Spectral Shaping." This application claims priority from both U.S. Provisional Patent Application No. 61/469,478 filed on Mar. 30, 2011, entitled "Improving Convergence Rate of Full Wavefield Inversion Using Spectral Shaping" and U.S. Provisional Patent Application No. 61/508,440 filed on Jul. 15, 2011 entitled "Convergence Rate of Full Wavefield Inversion Using Spectral Shaping," all of which are incorporated by reference herein in their entirety.

FIELD OF THE INVENTION

This invention relates generally to the field of geophysical prospecting and, more particularly to inversion of seismic data, a broad term used to signify a process of building a model of the subsurface based on recorded seismic data. Specifically, the invention is a method for improving the convergence rate of full wavefield inversion using spectral shaping. The term Full Wavefield Inversion ("FWI") is used to signify a type of inversion method aimed at generating subsurface models that can fully explain the recorded seismic data in an exact quantitative sense: accurate simulation of synthetic seismic data based on the subsurface model that is the result of the inversion should closely match the real seismic data.

BACKGROUND OF THE INVENTION

Geophysical inversion attempts to find a model of subsurface properties that optimally explains observed data and satisfies geological and geophysical constraints. There are a large number of well known methods of geophysical inversion. These well known methods fall into one of two categories, iterative inversion and non-iterative inversion. The following are definitions of what is commonly meant by each of the two categories:

Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography or Born inversion.

Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute.

The most common iterative inversion method employed in geophysics is cost function optimization. Cost function optimization involves iterative minimization or maximization of the value, with respect to the model M, of a cost function S(M) which is a measure of the misfit between the calculated and observed data (this is also sometimes referred to as the objective function), where the calculated data are simulated with a computer using the current geophysical properties model and the physics governing propagation of the source signal in a medium represented by a given geophysical properties model. The simulation computations may be done by any of several numerical methods including but not limited to finite difference, finite element or ray tracing. The simulation computations can be performed in either the frequency or time domain.

Cost function optimization methods are either local or global. Global methods simply involve computing the cost function S(M) for a population of models $\{M_1, M_2, M_3, \ldots\}$ and selecting a set of one or more models from that population that approximately minimize S(M). If further improvement is desired this new selected set of models can then be used as a basis to generate a new population of models that can be again tested relative to the cost function S(M). For global methods each model in the test population can be considered to be an iteration, or at a higher level each set of populations tested can be considered an iteration. Well known global inversion methods include Monte Carlo, simulated annealing, genetic and evolution algorithms.

Unfortunately global optimization methods typically converge extremely slowly and therefore most geophysical inversions are based on local cost function optimization. Algorithm 1 summarizes local cost function optimization.
1. selecting a starting model,
2. computing the gradient of the cost function S(M) with respect to the parameters that describe the model,
3. searching for an updated model that is a perturbation of the starting model in the negative gradient direction that better explains the observed data.

Algorithm 1—Algorithm for Performing Local Cost Function Optimization

This procedure is iterated by using the new updated model as the starting model for another gradient search. The process continues until an updated model is found that satisfactorily explains the observed data. Commonly used local cost function inversion methods include gradient search, conjugate gradients and Newton's method.

A very common cost function is the sum of the squared differences (L2 norm) of real and simulated seismic traces. For such a case, the gradient is calculated through a cross-correlation of two wavefields, as shown for the typical full wavefield inversion workflow in FIG. 1. Starting with an estimate of the source wavelet (101), and an initial subsurface model (102), we generate simulated seismic data (103) by propagating waves forward (104) from the source to the receiver locations. The data residuals (105) are formed by subtracting (110) the simulated data from the real seismic data (106). These residuals are then propagated backwards to the subsurface model (107) and cross-correlated with the source wavefield, generated by forward propagation (108) from the source location to the subsurface. The result of this cross-correlation is the gradient (109), on the basis of which the subsurface model is updated. The process is repeated with the new updated model, until the difference between simulated and real seismic data becomes acceptable.

For different cost functions the calculation of the gradient can be different. Still the basic elements of the workflow in FIG. 1 are quite general. The key ideas for the present invention can be trivially modified for cases where alternative cost functions and gradient computations are used.

Iterative inversion is generally preferred over non-iterative inversion, because it yields more accurate subsurface parameter models. Unfortunately, iterative inversion is so computationally expensive that it is impractical to apply it to many problems of interest. This high computational expense is the result of the fact that all inversion techniques require many compute intensive simulations. The compute time of any individual simulation is proportional to the number of sources to be inverted, and typically there are large numbers of sources in geophysical data, where the term source as used in the preceding refers to an activation location of a source apparatus. The problem is exacerbated for iterative inversion, because the number of simulations that must be computed is proportional to the number of iterations in the inversion, and the number of iterations required is typically on the order of hundreds to thousands.

Reducing the computational cost of full wavefield inversion is a key requirement for making the method practical for field-scale 3D applications, particularly when high-resolution is required (e.g. for reservoir characterization). A large number of proposed methods rely on the idea of simultaneously simulated sources, either encoded (e.g. Krebs et al., 2009; Ben-Hadj-Ali et al., 2009; Moghaddam and Herrmann, 2010) or coherently summed (e.g. Berkhout, 1992; Zhang et al., 2005, Van Riel and Hendrik, 2005). Inversion methods based on encoded simultaneous simulation often suffer from cross-talk noise contaminating the inversion result and are commonly limited by the data acquisition configuration (recording data with stationary receivers is a requirement for several of the methods). Methods based on coherent summation typically lead to loss of information. Nevertheless both types of approaches can be very helpful and are the subject of ongoing research.

A different way for reducing the computational cost of full wavefield inversion is by reducing the number of iterations required for convergence, and this is the objective of this invention. The method does not suffer from the typical limitations of the methods mentioned above, but it does not preclude their usage. In fact, it can, in principle, be used in combination with any of the simultaneous-source methods mentioned above, to potentially provide increased computational savings.

SUMMARY OF THE INVENTION

In one embodiment, the invention is a computer-implemented method for accelerating convergence of iterative inversion of seismic data to obtain a model of one or more physical parameters in a subsurface region, comprising: (a) using local cost function optimization, wherein an assumed or current model is updated to reduce misfit between the seismic data and model-simulated data, wherein a frequency spectrum of the updated model is controlled in a first iteration and thereafter to match a known or estimated frequency spectrum for the subsurface region; (b) wherein the controlling of the frequency spectrum comprises applying a spectral-shaping filter to a gradient of a cost function in model parameter space used to determine the update to the assumed or current model, said spectral-shaping filter being derived according to a criterion that the spectrum of the gradient of the cost function should match the known or estimated frequency spectrum for the subsurface region.

BRIEF DESCRIPTION OF THE DRAWINGS

The present invention and its advantages will be better understood by referring to the following detailed description and the attached drawings in which:

FIGS. 11A-11D show a synthetic example of a measured shot gather and a simulated shot gather, before and after spectral shaping by the present inventive method; and FIG. 12 shows the effect on a cross-correlation cost function of the spectral shaping from FIGS. 11A-11D.

Figure 1:
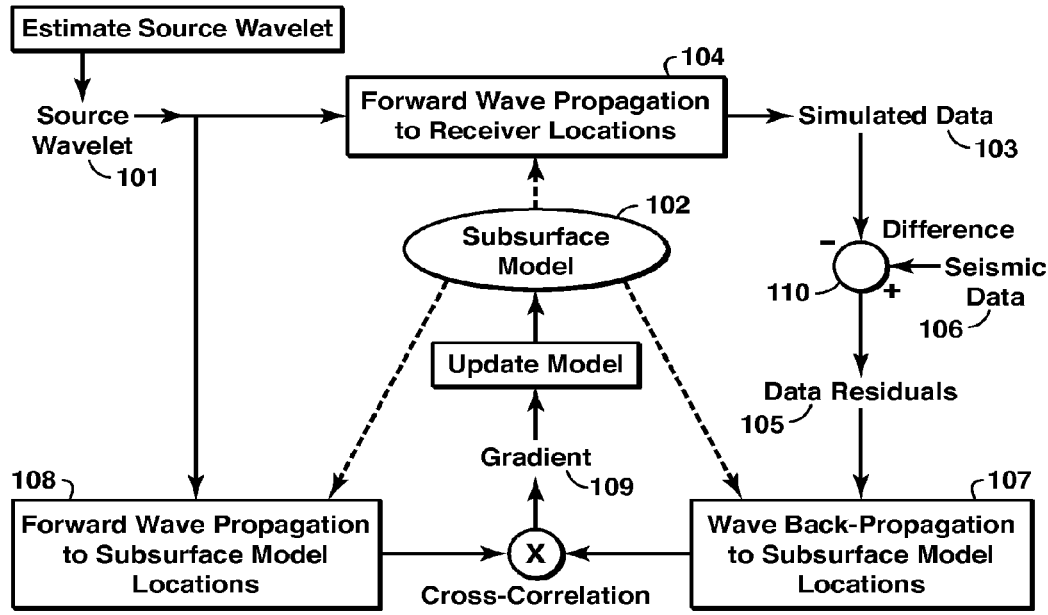
FIG. 1 is a flowchart showing basic steps in full wavefield inversion.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, the method must be performed on a computer programmed in accordance with the teachings herein.

DETAILED DESCRIPTION OF EXAMPLE EMBODIMENTS

A key idea behind the present inventive method is based on the assumption that a reasonable estimate of the frequency spectrum of the subsurface is known a-priori. If this is the case, the number of iterations required for convergence can be significantly reduced by guaranteeing that the inversion generates subsurface models with the desired frequency spectrum from the very first iteration. Intuitively it can be seen that this implies that computational effort does not need to be spent on iterations that mostly modify the spectrum of the subsurface model, and consequently the inversion converges to a final answer at a faster rate.

For this idea to be meaningful and practical, the following questions must be answered:

(1) Can it typically be assumed that good estimates of the frequency spectrum of the subsurface are available?

(2) How can it be guaranteed that the inversion results have the desired frequency spectrum, and, in particular, how can this be achieved this from the very first iteration?

The answers to these two questions are provided in the following two sections.

Estimating Frequency Spectrum of Subsurface Models

In papers on non-iterative inversion, Lancaster and Whitcombe (2000), Lazaratos (2006), Lazaratos and David (2008), and Lazaratos and David (2009) introduced the idea that the model generated by the non-iterative inversion should have a frequency spectrum that, on average, is similar to the spectrum of the earth's subsurface, as measured by well logs. (The terms amplitude spectrum and frequency spectrum may be used interchangeably herein to refer to amplitude versus frequency.) For any given area, this target spectrum can be derived by averaging the spectra of log curves recorded in local wells. Theoretically, the appropriate log curve to be used for normal-incidence reflection data is the P-impedance. In practice, it has been observed that the average spectra for most log curves are fairly similar. In fact, typical well-log spectra are fairly similar for a very large variety of geographic locations, depths and depositional environments, so that the general form of inversion target spectra is robust and well-defined. Because of the stability and robustness of well log spectra, the concept outlined in the aforementioned publications is widely used for non-iterative seismic inversion, even when local well control is not available.

Controlling the Frequency Spectrum of the Inversion Results

In general there are several parameters that characterize the subsurface that can be estimated with seismic inversion (e.g. P-impedance, S-impedance, density, P-velocity etc). The frequency spectra for these different parameters can, in principle, be different. So, when one refers to the frequency spectrum of a subsurface model, the parameter being referred to needs to be specified. The single-parameter inversion case is addressed first, where the subsurface model is described in terms of compressional (P) impedance (impedance is the product of velocity and density) only. This is a common application of inversion, since subsurface reflectivity mostly depends on variations of P-impedance. We then describe how the approach can be extended to multi-parameter inversion.

The frequency spectrum of the inversion results is related to the frequency spectrum of the seismic data and that of the source wavelet. In particular, for seismic reflection data, the convolutional model states that the seismic reflection response of a given subsurface can be calculated through the convolution of the seismic wavelet and the reflectivity of the earth. Assuming weak scattering, it can be shown that, for normal incidence, the reflectivity function can be simply calculated as the derivative of the P-impedance. For oblique incidence the calculation of reflectivity involves additional elastic parameters, but this does not fundamentally change the concept for the method presented here. In the frequency domain, the basic formula describing the convolutional model is:

$$D(f) = f I_p(f) W(f). \quad (1)$$

where f is frequency, D(f) is the average amplitude spectrum of the seismic data, W(f) the amplitude spectrum of the seismic wavelet and $I_p(f)$ the average amplitude spectrum of the subsurface P-impedance. Calculating the derivative of P-impedance in the time domain corresponds to multiplication by $i2\pi f$ in the frequency domain. For the present discussion, the $2\pi$ factor is omitted for simplicity, since it does not impact the conclusions or the implementation of the method. The factor i is also omitted since we will deal only with the amplitude spectrum.

The implication of what was just discussed is that, in order for the final inversion result to have a frequency spectrum $I_p(f)$, it is necessary to use a wavelet whose spectrum W(f) is related to the data spectrum D(f) by equation (1). Although equation (1) is theoretically valid only when the amplitude spectrum in the equation is for the particular parameter, P-impedance, it has been empirically observed that the spectra of different elastic parameters are typically quite similar. Described next is how the inversion problem can be reformulated such that the inversion generates a model with spectrum $I_p(f)$ from the very first iteration.

The model update in FWI is typically calculated as a scaled version of the gradient of the objective function with respect to the model parameter(s). For the usual L2 (least-squares) objective function, the gradient may be calculated by cross-correlating the forward-propagated source wavefield and the back-propagated residual wavefield. The spectrum of the forward-propagated source wavefield is proportional to the spectrum of the input wavelet W(f). For the first iteration, given that typical inversion starting models are very smooth and do not generate reflections, the data residuals are essentially equal to the recorded data, and therefore the spectrum of the back-propagated data residual wavefield is proportional to D(f). Therefore, the spectrum of the gradient G(f) is equal to the product of the spectra of the two cross-correlated wavefields (W(f) and D(f)), further multiplied with a frequency-dependent factor A(f) that depends on the specifics of the inversion problem being solved (e.g., 2D vs. 3D, acoustic vs. elastic inversion, elastic parameter being updated, etc). This factor can be derived either theoretically (e.g., for 2D constant-density acoustic inversions $A(f) = f^{1/2}$), or experimentally by calculating the spectrum of the gradient and comparing it to the product of the known spectra W(f) and D(f). So we can write:

$$G(f) = A(f) W(f) D(f). \quad (2)$$

Let us assume that the spectrum of the earth's impedance $I_p(f)$ is known a-priori and that we would like to have $G(f) = I_p(f)$. This will not be true in general. Still, we can appropriately transform the original inversion problem to a new one by applying a shaping filter H(f) to both the input wavelet and the data. The new shaped wavelet $W_s(f)$ and the shaped data $D_s(f)$ are related to the original wavelet and data spectra through the following:

$$W_s(f) = H(f) W(f)$$

$$D_s(f) = H(f) D(f). \quad (3)$$

Inverting for a model that matches the original data D(f) using a wavelet W(f) is equivalent to inverting for a model that matches the shaped data $D_s(f)$ using the shaped wavelet $W_s(f)$. Similar to equation (2), we now write for the shaped gradient $G_s(f)$:

$$G_s(f) = A(f) W_s(f) D_s(f) \quad (4)$$

$$= f A(f) H^2(f) W^2(f) I_p(f)$$

$$= \frac{A(f) H^2(f) D^2(f)}{f I_p(f)}.$$

We now determine H(f) such that $$G_s(f) = I_p(f). \quad (5)$$

and using equation (4) we get:

$$H(f) = \frac{1}{f^{1/2} A^{1/2}(f) W(f)} = \frac{f^{1/2} I_p(f)}{A^{1/2}(f) D(f)}. \quad (6)$$

Using the last equation, we get the following expressions for the shaped wavelet and data spectra:

$$W_s(f) = \frac{1}{f^{1/2} A^{1/2}(f)} \quad (7)$$

-continued $$D_s(f) = \frac{f^{1/2}}{A^{1/2}(f)} I_p(f).$$

Figure 2:
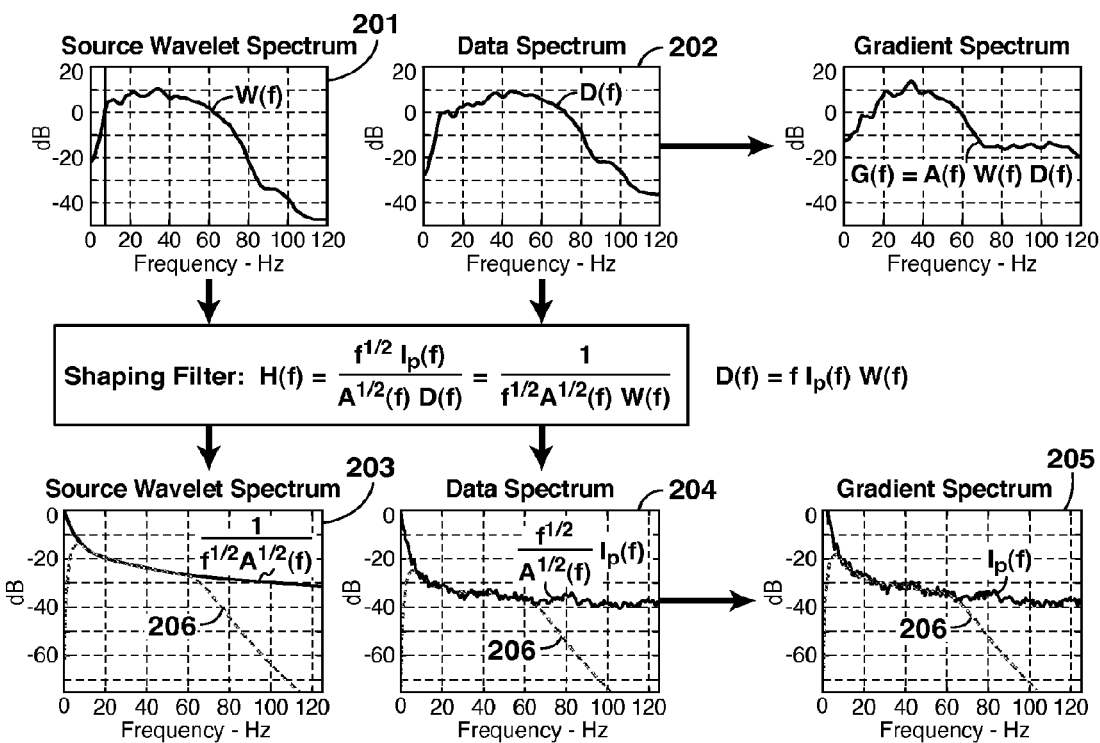
FIG. 2 is a schematic illustration of the effect of the application of a shaping filter of the present invention to the source wavelet and seismic data.

The effect of the application of the shaping filter is shown schematically in FIG. 2, where the frequency spectrum of the shaping filter is 206. The original inversion problem (wavelet W(f) (201) and data D(f) (202)) is transformed into a new one (wavelet $W_s(f)$ (203) and data $D_s(f)$ (204)), such that the gradient (205) has the desired spectrum $I_p(f)$.

The above discussion is valid even for the case where a larger range of reflection angles (not just normal incidence) is included in the inversion. The only conceptual modification occurs in equation (2), where the factor A(f) will now incorporate the effect of NMO stretch on the wavelet (Dunkin and Levin, 1973).

INVENTION EMBODIMENTS

Application of Spectral Shaping Filter to Input Data and Source Wavelet

Figure 3:
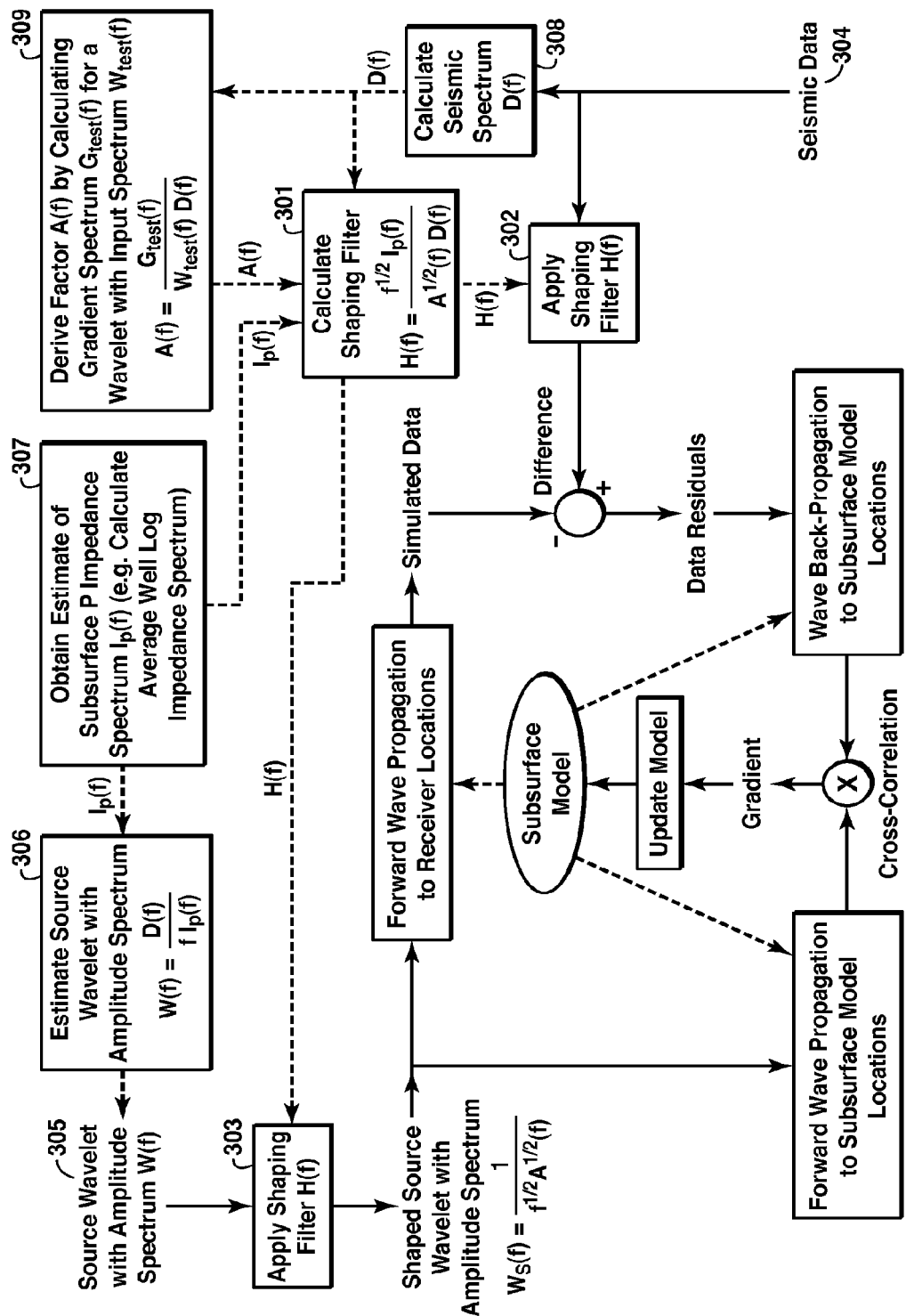
FIG. 3 is a flowchart showing basic steps in an embodiment of the present inventive method involving application of a spectral-shaping filter to the input data and source wavelet.

As explained in the previous section, the method can be implemented by applying an appropriate spectral shaping filter to the seismic data and the source wavelet, without otherwise modifying the inversion workflow that is shown in FIG. 1. FIG. 3 is a flowchart describing this embodiment of the method. A shaping filter H(f) (301) is applied (302 and 303) to the seismic data (304) and the source wavelet (305). The source wavelet needs to be selected (306) such that its amplitude spectrum W(f), the spectrum of the seismic data D(f) and the spectrum of the subsurface P impedance model $I_p(f)$ are linked through equation (1). For the calculation of the shaping filter, in addition to obtaining an a-priori estimate $I_p(f)$ (307) of the subsurface impedance spectrum, we need to calculate (308) the seismic spectrum D(f) and the factor A(f) (309). The latter can be derived conveniently by calculating the spectrum of the gradient $G_{test}(f)$ for a given input wavelet $W_{test}(f)$, and then setting A(f) equal to the ratio of $G_{test}(f)$ and the product $W_{test}(f)D(f)$.

Application of Spectral Shaping Filter to the Gradient

Instead of applying the shaping filter to the seismic data and the source wavelet, we can shape the spectrum of the gradient, such that it becomes similar to the a-priori estimate $I_p(f)$. This is shown schematically with the flowchart of FIG. 4. The shaping filter $H_G(f)$ is now applied directly to the gradient (401). The filter $H_G(f)$ can be derived (403) by dividing the desired spectrum $I_p(f)$ by the unshaped gradient spectrum G(f). The source wavelet needs to be selected (402) such that its amplitude spectrum W(f), the spectrum of the seismic data D(f) and the spectrum of the subsurface P impedance model $I_p(f)$ are linked through equation (1) of the previous section.

This embodiment of the invention is particularly flexible, allowing for the easy application of a time-variable filter $H_G(f)$: because the spectrum of the seismic data changes with time, one can expect that the spectrum of the gradient G(f) will also be changing; hence, to shape to the same target spectrum $I_p(f)$, the filter $H_G(f)$ will need to be time-variable. Although this can be easily accomplished when we apply the shaping filter directly to the gradient, it is not straightforward to handle with the first embodiment described above (shaping filter applied to the data and the source wavelet). On the other hand, the first embodiment is safer to apply when the data contain a substantial amount of wave modes other than primary reflections.

Figure 4:
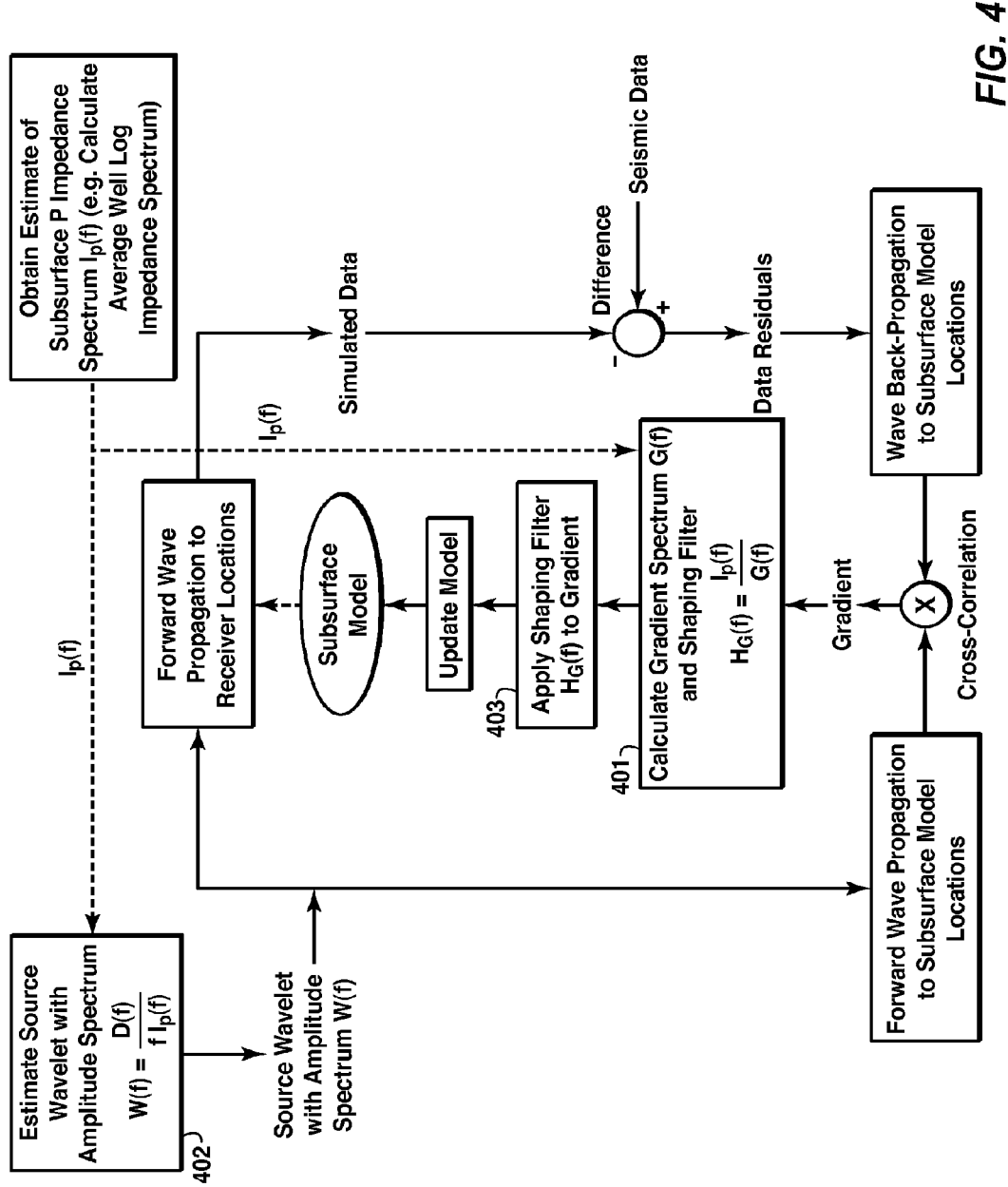
FIG. 4 is a flowchart showing basic steps of an embodiment of the present inventive method involving application of a spectral-shaping filter to the gradient of the cost function.

It should also be noted that the embodiment of FIG. 4 is applicable to obtaining any elastic parameter, not just P-impedance, merely by substituting, for $I_p(f)$ in the shaping filter formula in step 401, the amplitude spectrum corresponding to the other elastic parameter. That is not true for the embodiment of FIG. 3, which is valid only for P-impedance.

Extension to Multi-Parameter Inversion

Figure 5:
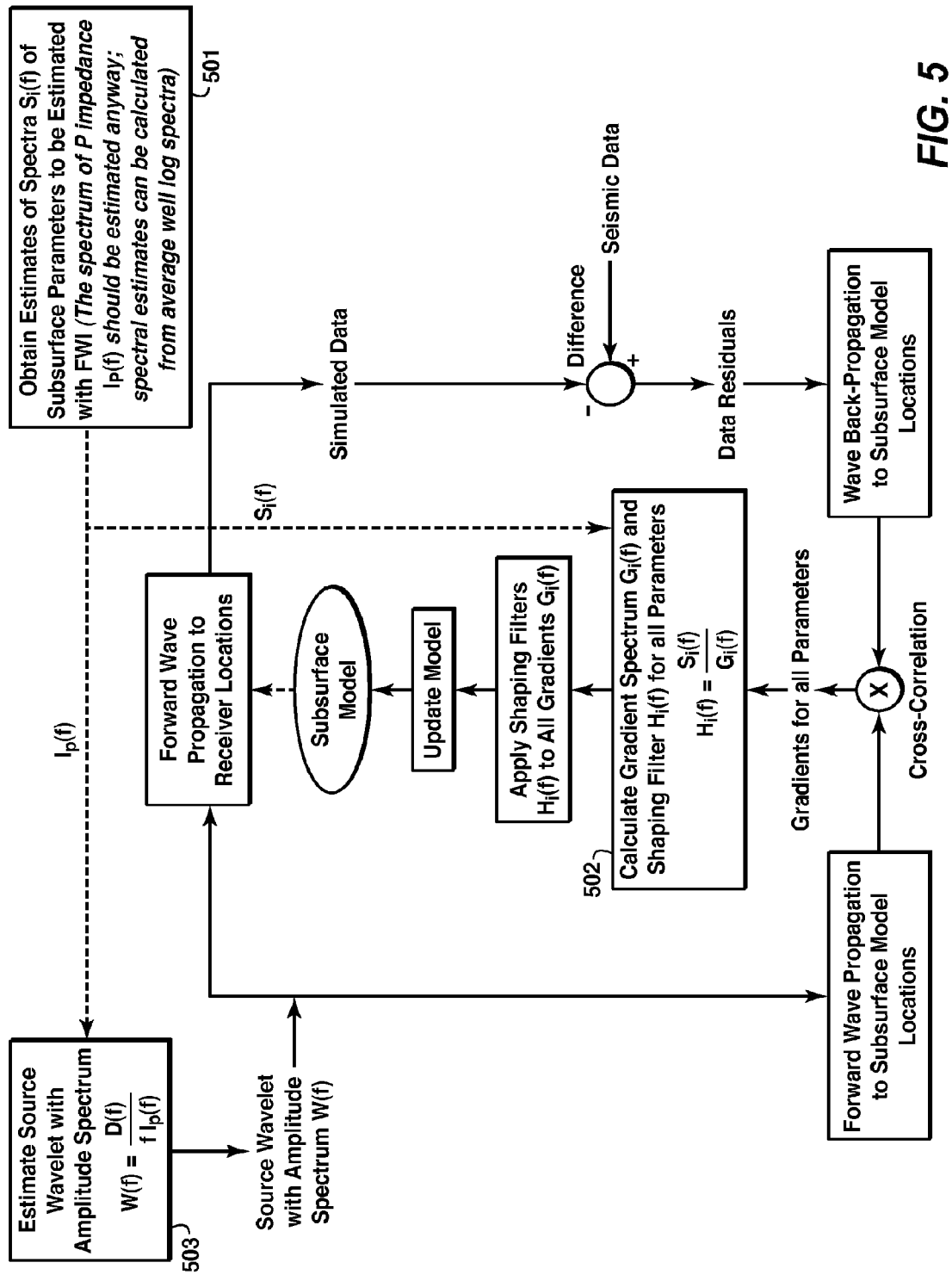
FIG. 5 is a flowchart showing basic steps of the embodiment of FIG. 4 extended for the multi-parameter inversion case.

The method can be extended in a straightforward way for the case of multi-parameter inversion, when several subsurface parameters, in addition to P impedance, are being estimated. A corresponding flowchart is shown in FIG. 5. Assuming estimates $S_i(f)$ of the amplitude spectra of the different subsurface parameters (501) (e.g. from average well log spectra) can be obtained, the spectra of the gradients $G_i(f)$ with respect to the different parameters can be shaped using shaping filters $H_i(f)$, derived by dividing the desired spectra $S_i(f)$ by the unshaped gradient spectra $G_i(f)$ (502).

Notice that, again, the source wavelet needs to be selected (503) such that its amplitude spectrum W(f), the spectrum of the seismic data D(f) and the spectrum of the subsurface P impedance model $I_p(f)$ are linked through equation (1). Because of this, an a-priori estimate of $I_p(f)$ is necessary, whether or not obtaining an estimate of P impedance is an objective of the inversion, except in embodiments of the invention where spectral differences between different elastic parameters are considered negligible.

Comparison to Non-Iterative Inversion Methods

For the non-iterative inversion methods in the references above (Lancaster and Whitcombe (2000), Lazaratos (2006), Lazaratos and David (2008), and Lazaratos and David (2009)) no forward simulation is taking place, so there is no need to estimate a source wavelet. The means of controlling the final spectrum in these prior methods is to shape the spectrum of the answer so that it has the desired spectrum. The non-iterative inversion methods assume that input data are or will be migrated and stacked, and that, after migration and stacking, they can be modeled by the convolutional model (stating that the seismic response can be found by convolving the wavelet with the earth's reflectivity, which is the derivative of impedance). Assuming this is true, the earth's impedance can be derived by the application of a shaping filter to the result of migration and stacking. The mathematical derivation of why this shaping filter should indeed recover impedance from the data is included in Lazaratos (2006) and in Lazaratos and David (2008). In the latter reference, the point is made that the shaping filter is optimally applied before migration. The methodology can be extended to inversion for other parameters, and that is explained in Lazaratos (2006). Thus, traditional non-iterative inversion is not the same thing as completing one cycle of an iterative inversion process, and then stopping.

For iterative inversion using the present inventive method, the means for controlling the final spectrum is by choosing a source wavelet spectrum W(f) that fulfills equation (1). But even if we control the final spectrum by the choice of wavelet W(f), this does not guarantee that we control the spectrum for every iteration, beginning with the first. To do that, we need to apply the rest of the inventive method as disclosed herein, including the spectral-shaping filter. Until that happens, there will be no overall reduction in the number of iterations, and no computational speed-up, which (i.e., the speed-up) is a key advantage of the present invention for iterative inversion. Therefore, preferably the full method is applied beginning with the first iteration.

For the embodiment of FIG. 3, the shaping filter is applied to the wavelet and the data once and does not need to be re-applied. The embodiment of FIG. 4 provides more flexibility and, in principle, may benefit from application at every iteration. The shaping filter in that drawing is defined as the ratio of the desired spectrum to the current G(f). This ratio is going to be different from unity in the first iteration, and reapplying the shaping filter as indicated in FIG. 4 will correct for that. If the spectrum of the update should remain constant after that, the shaping filter will have no effect because $H_G(f)$ becomes the identity operator. But if the update G(f) deviates from the target (Ip(f) for the case of P-impedance), the filter will be adjusted to correct for it.

Examples

Figure 6:
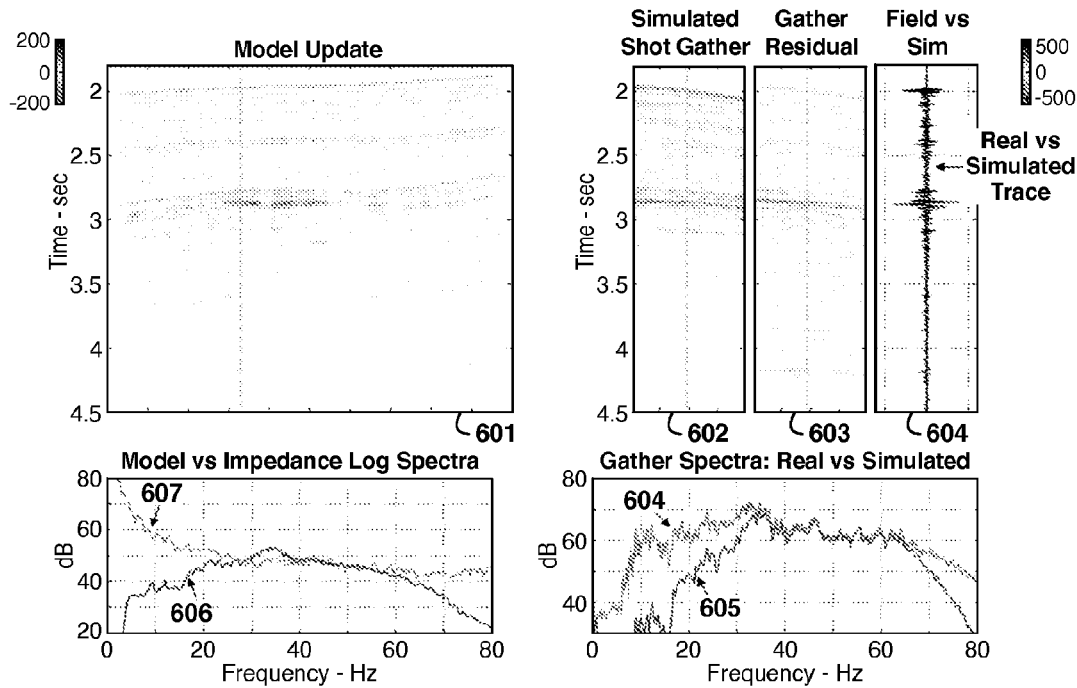
FIGS. 6-8 illustrate convergence of full wavefield inversion ("FWI") after 10 iterations (FIG. 6), 50 iterations (FIG. 7), and 100 iterations (FIG. 8)
Figure 7:
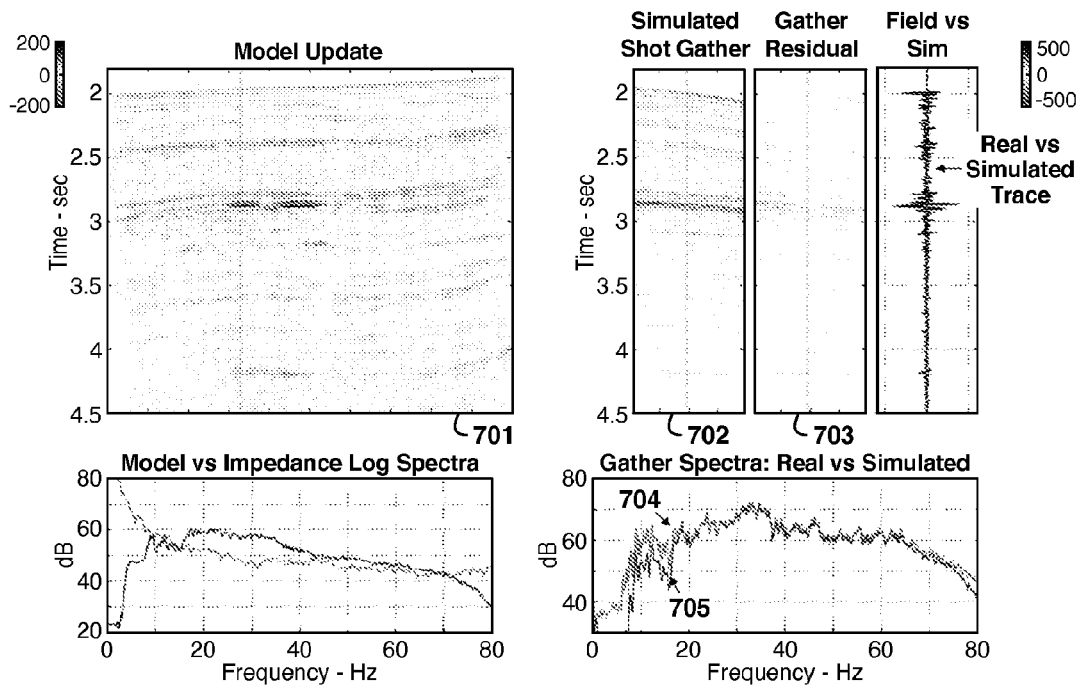
Figure 8:
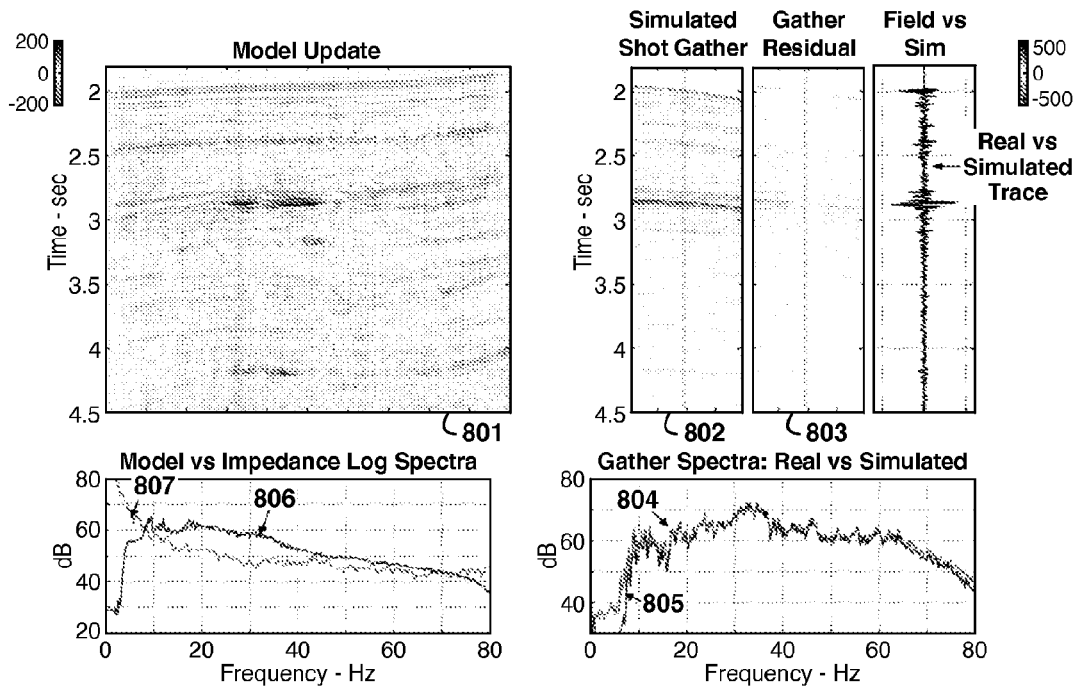

An example illustrating how the Full Wavefield Inversion process can be very slow to converge is shown in FIGS. 6, 7 and 8, illustrating the convergence behavior for a small-size 2D problem. Some of the plots present in all three figures are the cumulative model update (601, 701, 801), a simulated shot gather (602, 702, 802) and the data residual for this gather (603, 703, 803), and a comparison of the frequency spectra for real (604, 704, 804) and simulated (605, 705, 805) shot gathers. After 10 inversion iterations (FIG. 6) there is still considerable mismatch between the real and synthetic data, as is evident from an inspection of the data residuals (603) and gather spectra (604, 605). The match has considerably improved after 50 iterations (FIG. 7), but inspection of the spectra (704, 705) reveals that there are still differences for the lower frequencies. It takes about 100 iterations (FIG. 8) to reach a more complete match and, even then, there are still differences in the 5-8 Hz frequency band. The comparison (609) between a real and a simulated trace corresponds to the horizontal position indicated by the dashed vertical line in 602 and 603, and similarly in FIGS. 7-10.

Figure 9:
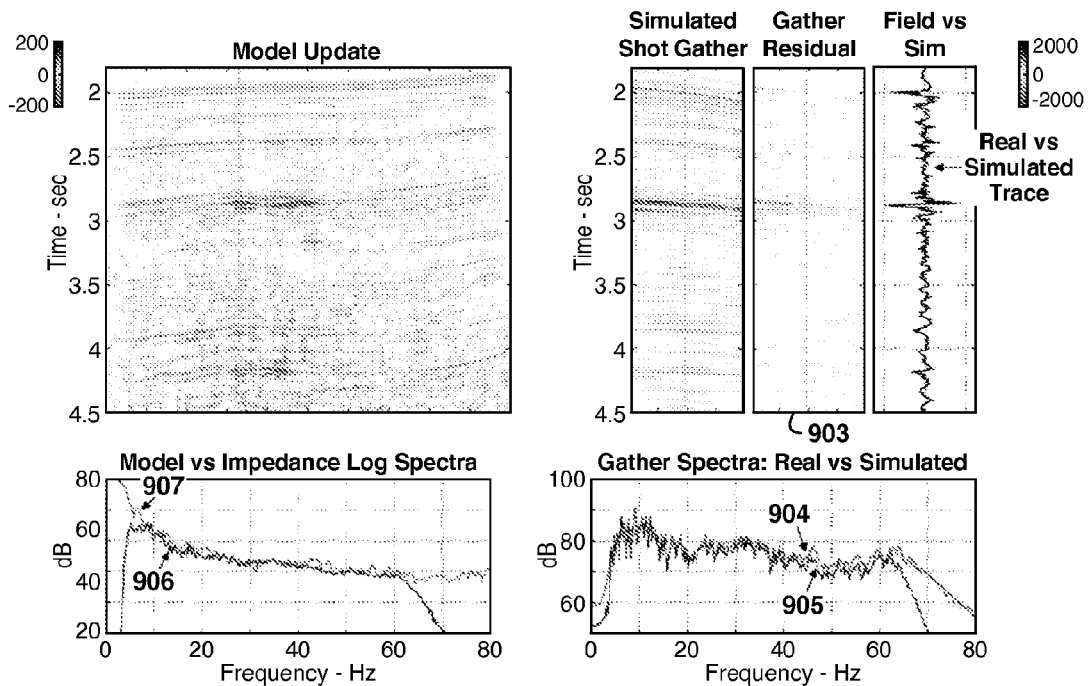
FIGS. 9-10 illustrate convergence of FWI iteration after 1 iteration (FIG. 9) and after 4 iterations (FIG. 10), with application of a shaping filter of the present invention to the seismic data and source wavelet used in the examples of FIGS. 6-8.
Figure 10:
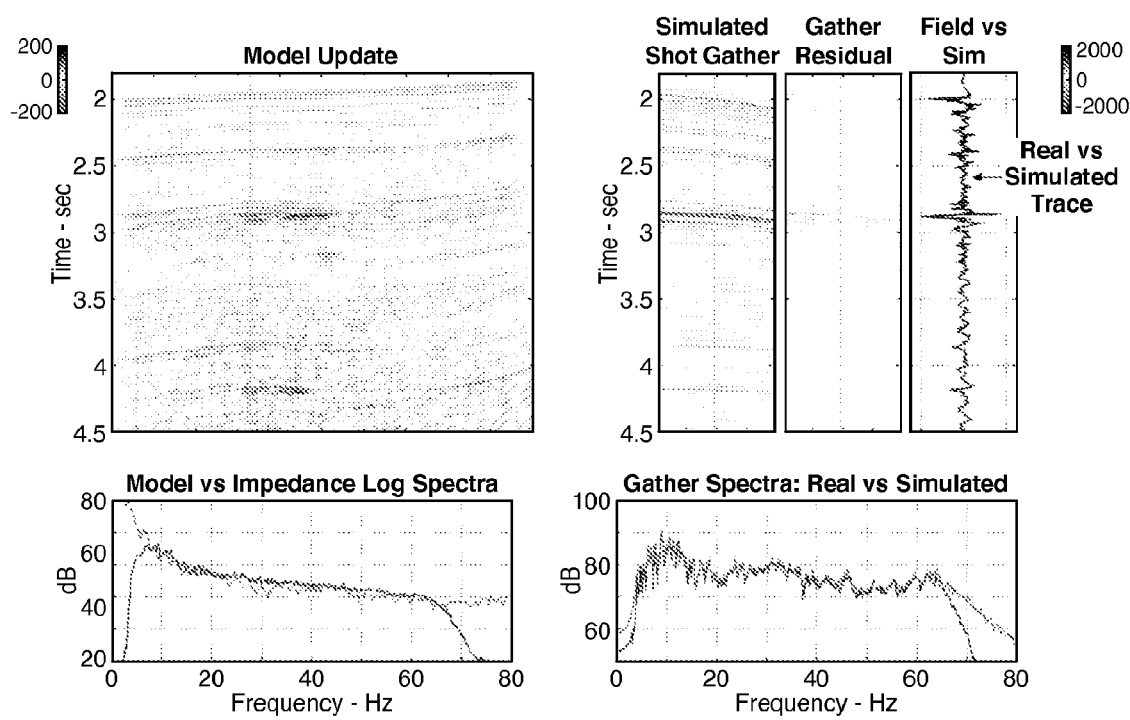

FIGS. 9 and 10 illustrate the effect of applying the disclosed invention to the same example. Notice that from the very first iteration (FIG. 9) the data residuals (903) are very small, the synthetic (905) and real (904) data spectra are very similar over the bandwidth of interest (5-60 Hz) and the spectrum of the model update (906) is very similar to the average impedance log spectrum (907). Contrast this with FIGS. 6 to 8 where the model update spectrum (606) starts quite different from the average impedance log spectrum (607), and is still somewhat different from it even after 100 iterations (806, 807). Using the spectral shaping approach described here the inversion essentially converged in 4 iterations (FIG. 10).

The cross-correlation objective function is commonly used in seismic inversion to match the phase of the data, and it is often considered to be robust when precise amplitudes cannot fit the simulation physics. In spite of its robustness to amplitude variations, the non-zero lag cross-correlation function is typically oscillatory in nature and the goal of the inversion is to find the global maximum of this function. Because of this oscillatory nature, the optimization algorithm can have difficulty in finding maxima. The problem is exacerbated when the data are noisy. If there is a mechanism to make this cross-correlation more peaked, then it will help the objective function to determine the global maximum and thereby avoiding getting stuck in local maxima. Spectral shaping helps to achieve that goal in making the correlation function peaked since it enhances the weighting towards the low frequency component of the data. Therefore shaping not only improves the convergence of FWI, but also shapes the objective function which helps the optimization algorithm to better locate the maxima of the objective function. The oscillatory nature of the cross-correlation function can also be mitigated by using the envelope of the non-zero lag cross-correlation objective function. The envelope typically has many fewer oscillations compared to the actual function. A preferred approach to compute such an envelope is the Hilbert transform of the non-zero lag cross-correlation objective function [Benitez et al., 2001].

A typical normalized cross-correlation objective function is given by:

$$\phi = \frac{d^{meas} \otimes d^{simulated}}{\|d^{meas}\|\|d^{simulated}\|}$$

where $d^{meas}$ is the measured data, $d^{simulated}$ is simulated data, and $\otimes$ is the non-zero lag cross-correlation operator. The shaping operation can be regarded as a convolution of shaping function with the observed data as well as the predicted data. The shaped normalized cross-correlation objective function is given by:

$$\phi_{shaped} = \frac{(S * d^{meas}) \otimes (S * d^{simulated})}{\|(S * d^{meas})\|\|(S * d^{simulated})\|}$$

where S is the shaping function that has a spectrum similar to impedance spectra (Lazaratos et. al, 2011).

Krebs et al. (PCT Patent Publication No. WO/2008/042081) have shown that inversion speed may be greatly increased by using source encoding, and simultaneously inverting many sources in a single encoded gather. A preferred embodiment disclosed in this publication changes the encoding from one iteration to the next. Routh et al. have shown that the cross-correlation objective function is particularly advantageous in simultaneous encoded-source inversion when the fixed receiver assumption is not satisfied. (U.S. Provisional Patent Application Ser. No. 61/418,694)

Synthetic Example

The advantages of the shaped cross-correlation objective function can be demonstrated with a synthetic example. From the observed shot gather (FIG. 11A) and predicted shot gather at convergence (FIG. 11B) before shaping, and the same two quantities after shaping (FIGS. 11C and 11D), it can be seen in FIG. 12 that after shaping the cross-correlation function is peaked and less oscillatory after shaping (121) than before shaping (122). FIG. 12 shows the normalized cross-correlation as a function of lag, with the zero-lag corresponding to index 3000 on the "x"-axis. The reduction of oscillatory nature can potentially help optimization algorithms that are global in nature in finding the maxima of the objective function such as simulated annealing, genetic algorithm, evolutionary algorithms etc. Another interesting aspect is that one can work with the envelope of the cross-correlation objective function as the quantity to be maximized. The envelope typically has much less oscillation compared to the function itself.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Ben-Hadj-Ali, H., Operto, S., and Virieux, J., "Three-dimensional frequency-domain inversion with phase encoding, *Expanded Abstracts*," 79$^{th}$ SEG Annual Meeting, Houston, 2288-2292 (2009).

Benitez, D., Gaydecki, P. A., Zaidi, A., and Fitzpatrick, A. P., "The use of the Hilbert transform in ECG signal analysis," *Computers in Biology and Medicine*, 399-406 (2001).

Berkhout, A. J., "Areal shot record technology," *Journal of Seismic Exploration* 1, 251-264 (1992).

Dunkin, J. W., and Levin, F. K., "Effect of normal moveout on a seismic pulse," *Geophysics* 28, 635-642 (1973).

Krebs et al., "Iterative inversion of data from simultaneous geophysical sources," PCT Patent Application Publication No. WO 2008/042081.

Krebs, J., Anderson, J., Hinkley, D., Neelamani, R., Lee, S., Baumstein, A., and Lacasse, M., "Full-wavefield seismic inversion using encoded sources," *Geophysics* 74, WCC177-WCC188 (2009).

Lancaster, S., and Whitcombe, D., "Fast track "coloured" inversion," *Expanded Abstracts*, 70$^{th}$ SEG Annual Meeting, Calgary, 1572-1575 (2000).

Lazaratos, S., "Spectral Shaping Inversion for Elastic and Rock Property Estimation," *Research Disclosure*, Issue 511, (November 2006).

Lazaratos, S., and David, R. L., "Spectral shaping inversion and migration of seismic data," U.S. Publication No. 2010/0270026 (2008).

Lazaratos, S., and David, R. L., 2009, "Inversion by pre-migration spectral shaping," *Expanded Abstracts*, 79$^{th}$ SEG Annual Meeting, Houston.

Moghaddam, P., and Herrmann, F. J., "Randomized full-waveform inversion: a dimensionality-reduction approach," *Expanded Abstracts*, 80$^{th}$ SEG Annual Meeting, Denver, 978-982 (2010).

Routh et al., "Simultaneous source inversion for marine streamer data with cross-correlation objective function," U.S. Provisional Patent Application Ser. No. 13/224,005 (2010).

Van Riel, P., and Hendrik, W. J. D., "Method of estimating elastic and compositional parameters from seismic and echo-acoustic data," U.S. Pat. No. 6,876,928 (2005).

Zhang, Y., Sun, J., Notfors, C., Gray, S. H., Cherris, L., Young, J., "Delayed-shot 3D depth migration," *Geophysics* 70, E21-28 (2005).

The invention claimed is:

1. A computer-implemented method for accelerating convergence of iterative inversion of seismic data to obtain a model of one or more physical parameters in a subsurface region, comprising:

using local cost function optimization, wherein an assumed or current model is updated to reduce misfit between the seismic data and model-simulated data, wherein a frequency spectrum of the updated model is controlled in a first iteration and thereafter to match a known or estimated frequency spectrum for the subsurface region;

wherein the controlling of the frequency spectrum comprises applying a spectral-shaping filter to a gradient of a cost function in model parameter space used to determine the update to the assumed or current model, said spectral-shaping filter being derived according to a criterion that the spectrum of the gradient of the cost function should match the known or estimated frequency spectrum for the subsurface region.

2. The method of claim 1, wherein the spectral-shaping filter is applied to the gradient in at least the first iteration; and wherein the model updating comprises generating model-simulated data using a source wavelet having a frequency spectrum W(f) that satisfies D(f)≈fI$_p$(f)W(f), where D(f) is an average frequency spectrum of the seismic data, f is frequency, and I$_p$(f) is an average frequency spectrum of P-impedance in the subsurface region or is approximated by a frequency spectrum of a different elastic parameter of the subsurface region; and wherein said known or estimated frequency spectrum is I$_p$(f).

3. The method of claim 2, wherein the spectral-shaping filter H(f) is determined by dividing a known or estimated frequency spectrum S(f) in the subsurface region for said one of the one or more physical parameters by G(f), where G(f) is a frequency spectrum of the gradient before shaping.

4. The method of claim 2, wherein the spectral-shaping filter varies with time.

* * * * *